United States Patent [19]

Visser

[11] 3,981,514

[45] Sept. 21, 1976

[54] OUTRIGGER

[75] Inventor: Peter J. Visser, Niles, Mich.

[73] Assignee: Clark Equipment Company, Buchanan, Mich.

[22] Filed: Feb. 18, 1975

[21] Appl. No.: 550,403

Related U.S. Application Data

[63] Continuation-in-part of Ser. No. 406,749, Oct. 15, 1973, Pat. No. 3,909,040.

[52] U.S. Cl. .................................. 280/765; 212/145; 254/86 R

[51] Int. Cl.² ............................................ B60S 9/02

[58] Field of Search ..................... 212/145; 104/263; 280/150.5; 254/86 R, 86 H

[56] References Cited

UNITED STATES PATENTS

| | | | |
|---|---|---|---|
| 2,621,811 | 12/1952 | Lull | 212/145 |
| 2,837,312 | 6/1958 | Troche | 280/150.5 |
| 3,236,501 | 2/1966 | McKay | 280/150.5 |
| 3,262,582 | 7/1966 | Pitman et al. | 280/150.5 |
| 3,279,622 | 10/1966 | Person | 212/145 |
| 3,780,877 | 12/1973 | Levitt | 212/145 |
| 3,801,068 | 12/1972 | Kopas | 280/150.5 |

*Primary Examiner*—Robert J. Spar
*Assistant Examiner*—Lawrence J. Oresky
*Attorney, Agent, or Firm*—Kenneth C. Witt

[57] ABSTRACT

An outrigger for stabilizing a vehicle, including telescopic members and a power actuator to extend and retract the outrigger. The outer telescopic member is pivoted adjacent one side of the vehicle and extends beneath it. A combined guide and support member causes initial outward extension of the outrigger to be horizontal but toward the end of the horizontal travel the guide and support member causes outer end of the outrigger to move downwardly.

4 Claims, 6 Drawing Figures

OUTRIGGER

CROSS-REFERENCE TO RELATED PATENTS

This is a continuation-in-part of co-pending application Ser. No. 406,749 filed Oct. 15, 1973, now U.S. Pat. No. 3,909,040 dated Sept. 30, 1975.

The outrigger construction of the present invention may be employed advantageously with the load transfer mechanism of U.S. Pat. No. 3,718,221, dated Feb. 27, 1973, which is assigned to the same assignee as the present invention. However, it will be appreciated that it is not limited to such use, but may be applied also to other load transfer and load handling mechanisms and vehicles which require stabilization.

BACKGROUND OF THE INVENTION

1. Field of the Invention

This invention relates to outrigger mechanisms utilized to stabilize vehicle mounted load handling and load transfer mechanisms and the like to make it possible for such mechanisms to have a greater reach without instability of overturning. The use of outriggers as stabilizers in effect extends the base of the vehicle or other mechanism and thus makes it possible to shift the center of gravity a greater distance laterally without getting it beyond the point which might result in overturning.

2. Description of the Prior Art

Various devices have been used heretofore to stabilize vehicles and other mechanisms, and attention is called to the outrigger of my U.S. Pat. No. 3,743,108, dated July 3, 1973, which is assigned to the same assignee as the present invention. In the outrigger mechanism disclosed and claimed therein an outer telescopic member is pivotally connected adjacent one side of the vehicle to be stabilized and extends beneath the vehicle. The other end of the outer telescopic member is connected to the vehicle by means of a bracket which is movable longitudinally along the outer telescopic member. There is a track on the bracket at an angle with the axis of the outrigger, and a guide and support member is located on the vehicle and co-acts with the track. The bracket is moved in and out to produce vertical movement of the outer end of the outrigger.

A common type of outrigger is a straight, horizontally disposed beam which is extended either manually or by power means and then jack or float at the end of such beam is lowered, again either manually or by power means, to provide vertical adjustment for the outrigger.

Still another known type of outrigger utilizes a member which is curved and extends along a curved path from beneath the vehicle out of the side to accomplish movement which includes both a horizontal component outwardly and a vertical component downwardly, and an example of such an outrigger is illustrated by U.S. Pat. No. 3,021,015 dated Feb. 13, 1962.

A principal object of the present invention is an outrigger which utilizes a single power actuator to extend and retract the outrigger and also to move it vertically down and up, while providing for the initial extension movement of the outrigger to be rectilinear and generally horizontal.

SUMMARY OF THE INVENTION

In carrying out my invention in one mode, I provide an outrigger having an outer elongated member which is pivotally connected to the frame of a vehicle adjacent one side. It is disposed in a horizontal position and extends toward the other side of the vehicle. An inner telescopic member within the outer member is movable outwardly and inwardly, and power means are provided for selectively moving the inner member outwardly and inwardly. Guide and support means interconnected between the outrigger and the frame of the vehicle are responsive to movement of the inner member for causing the outrigger to pivot downwardly during outward movement of the outer member, whereby the movement of the outrigger is first horizontal and then as it nears the end of its travel the outer end moves downwardly to engage the ground.

DESCRIPTION OF PREFERRED EMBODIMENT

Figure 1:
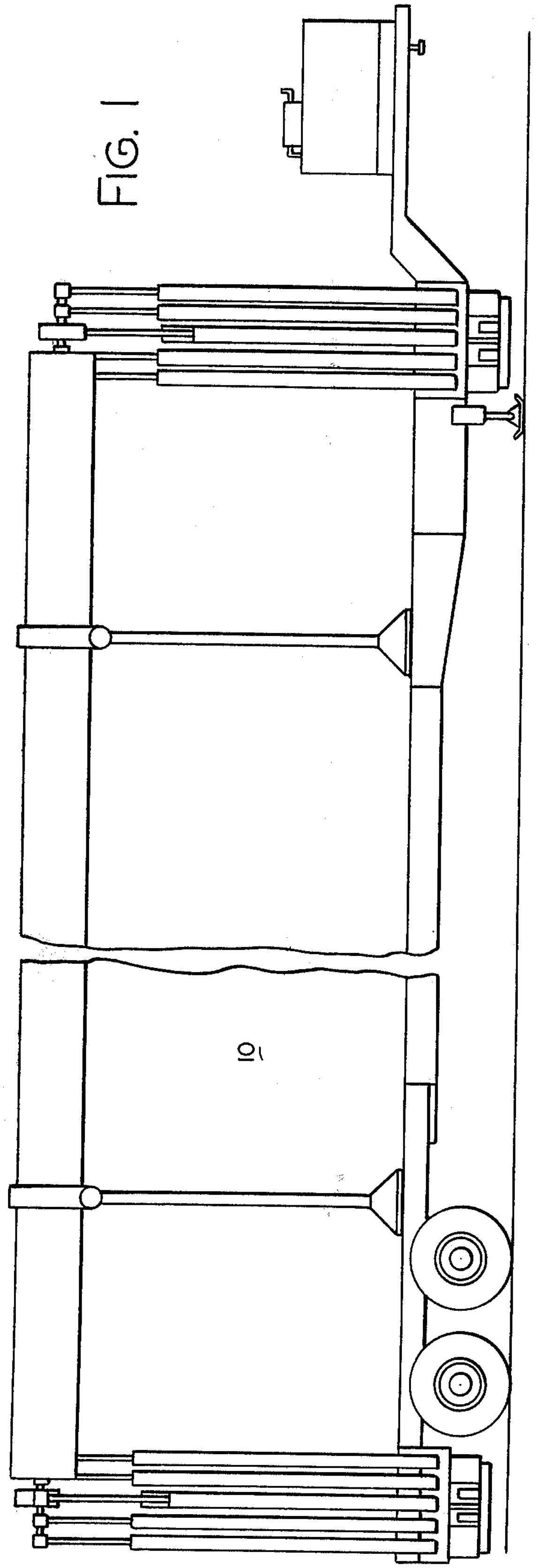
FIG. 1 shows a schematic side elevational view of a load transfer mechanism with which the outrigger of the present invention may be utilized advantageously.
Figure 2:
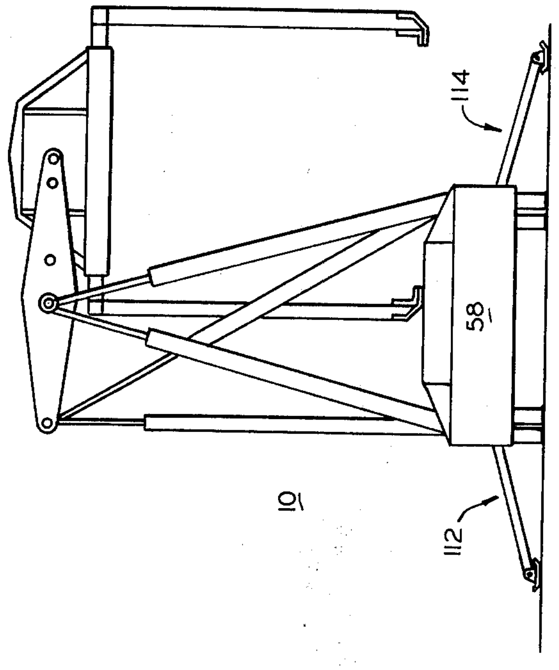
FIG. 2 shows a schematic end view of the load transfer mechanism of FIG. 1 with outriggers in their extended positions.

FIGS. 1 and 2 of the drawing show a load transfer mechanism 10 the same as the aforementioned U.S. Pat. No. 3,718,221 except for the incorporation of outriggers in accordance with the present invention. There are four individual outriggers at the rear portion of the load transfer mechanism and four similar outriggers at the front portion. All outriggers are shown retracted in FIG. 1.

FIG. 2 shows a schematic end elevational view of the load transfer mechanism of FIG. 1, looking from the left, with the rear outriggers of the first embodiment housed within the transverse box portion 58, and two of the outriggers identified by the numerals 112 and 114 extended respectively to the left and right.

Figure 3:
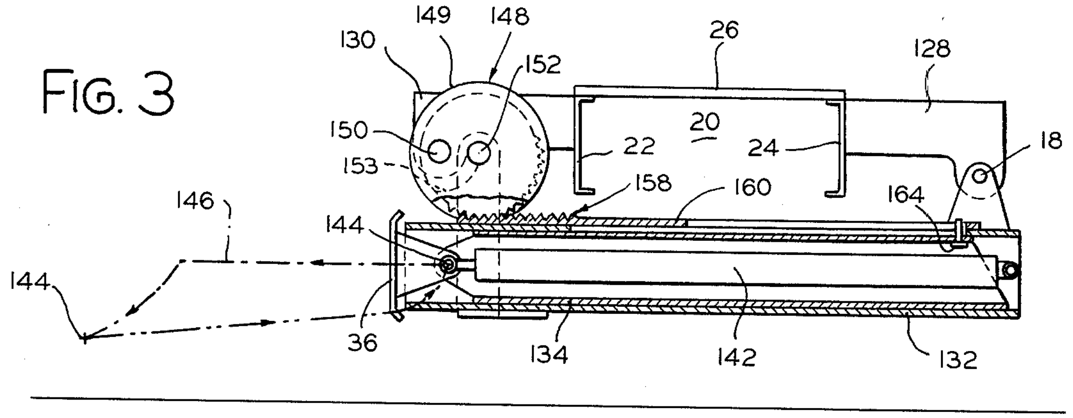
FIG. 3 is a schematic and sectional view of a preferred embodiment of the invention showing an individual outrigger in the retracted position.

FIG. 3 shows schematically individual outrigger 112 in its raised contracted position, with most of the structural portion of the load transfer mechanism omitted for the sake of clarity. The other individual outriggers are essentially the same except that half of them, including outrigger 114, are reversed in position and arrangement. These outriggers utilize a rack and gear mechanism to produce the downward movement of the outer end of the outrigger responsive to extension thereof.

The outrigger illustrated in FIG. 3 comprises an outer telescopic member 132 which is pivotally connected at 18 to an extension 128 on the frame 20 of the load transfer mechanism. As shown schematically, the frame 20 includes a pair of longitudinal channel members 22 and 24, a top cover plate 26 welded to the channel members, and a pair of outward or lateral projections 128 and 130 on opposite sides of the frame structure for supporting the outriggers.

An inner telescopic member 134 is positioned within outer member 132 and arranged to be moved reciprocally outwardly and inwardly by means of a hydraulic actuator 142. The path of travel of the connection point 144 for both the foot plate 36 and also the actuator 142 in this case, is illustrated by the dot-dash line 146. This line shows the path of point 144 both during its extension and subsequent retraction, with the direction of travel being indicated by the arrows.

Figure 5:
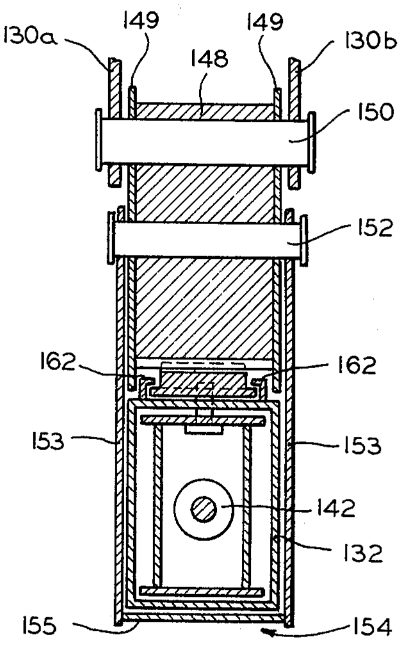
FIG. 5 is a sectional view along the line 5—5 of FIG. 4.

In this embodiment the outrigger is guided and supported and also moved upwardly and downwardly by the rack and gear and associated structure which is described hereinafter. Reference is made particularly to FIG. 5 for many of the details of this structure.

This embodiment includes a pivotal support member 148 which is circular in configuration. Member 148 is pivotally connected by means of pin 150 to the frame of the vehicle or machine and in FIG. 5 the frame is indicated by members 130*a* and 130*b* on the opposite sides of member 148 respectively. Also extending through member 148 is a pin 152 from which is suspended a stirrup support structure 154 which extends beneath the outer telescopic member 132 as shown and supports the outrigger in both its retracted and extended condition. The stirrup member includes side portions 153 and bottom portion 155 welded between the two side portions. Support 154 is suspended from pin 152 by means of side portions 153.

Member 148 has a circular tooth portion 156 thereon which is in mesh with a straight tooth portion 158 on a movable slide member 160 which is retained between longitudinal extending guides 162 on the top surface of outer telescopic member 132. The center of circular tooth segment 156 is the axis of pin 152. As seen best in FIG. 6, a pin 164 is secured to inner telescopic member 134 in a suitable manner as by welding and extends upwardly through a slot 166 in outer telescopic member 132 and a slot 167 in slide member 160.

Figure 4:
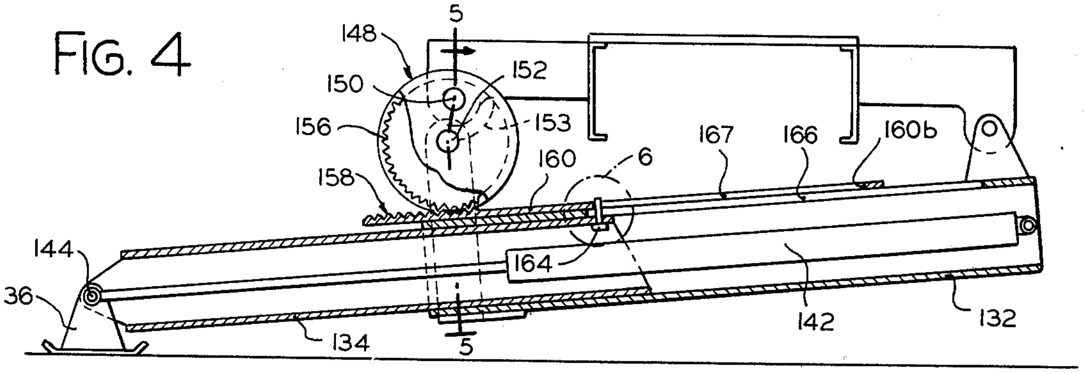
FIG. 4 shows the outrigger of FIG. 3 in the extended position.
Figure 6:
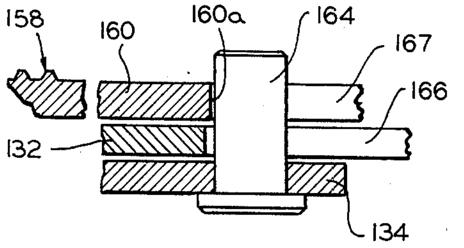
FIG. 6 is an enlarged fragmentary view of the portion of FIG. 4 indicated at 6 in FIG. 4.

During operation of this embodiment, as inner telescopic member 134 is extended by the extension of actuator 142, pin 164 engages slide member 160 at a predetermined location, indicated at 160*a* in FIG. 6, and through the rack and gear interconnection, causes support member 148 to pivot clockwise about pivot 150 from the position shown in FIG. 3 to the position shown in FIG. 4 as such extension proceeds. This swings the axis of pin 152 downwardly along the arc indicated at 153 to the position shown in FIGS. 4 and 5. The axis of 152 preferably moves through a vertical plane which includes the axis of pin 150, making the structure self-locking.

In the initial retracted position of the outrigger as illustrated in FIG. 3 it is supported in a substantially horizontal position by the member 148 being supported by pin 150 on the frame 20, and member 148 in turn supporting the stirrup member 154 and the remainder of the outrigger device through pin 152. The support member 148, stirrup member 154 and associated parts support the outrigger at all times, in varying conditions of extension and lowering. During contraction of the outrigger the lower portion of the path 146 indicated in FIG. 3 is followed as the pivot point 144 returns from the extended position to the retracted position; the pin 164, after moving through slot 167 engages slide member 160 at 160*b* and, through the rack and gear mechanism, causes support member 148 to be restored to the condition of FIG. 3.

It will be observed that member 148 has guide plates 149 on each side and these are arranged to cooperate with guides 162 to assist in maintaining proper alignment of the various parts during operation.

It will be appreciated that the guide and support construction of this invention is utilized to support the outrigger when it is retracted and when it is extended and guide it between such two extremes. This invention also provides for the transfer of the load from the frame of the machine being stabilized through member 148 to the outrigger and thence to the ground.

While I have illustrated and described herein a preferred mode of carrying out my invention it will be appreciated that modifications may be made. Accordingly, it should be understood that I intend to cover by the appended claims all such modifications which fall within the true spirit and scope of my invention.

I claim:

1. An outrigger for a machine having a frame, the outrigger comprising an outer elongated member, a connection adjacent one end of the said outer member pivotally connecting the outer member to the frame, an inner member within the said outer member and movable outwardly and inwardly of the said outer member, power means for selectively moving the said inner member, and movable guide and support means interconnected between the said outer member and frame and responsive to movement of the inner member for causing the outrigger to pivot away from the frame during outward movement of the said inner member, the said movable guide and support means including a support member pivotally supported on the frame and a depending support structure extending beneath the said outer member and pivotally connected on a different axis to the said pivotal support member.

2. An outrigger as specified in claim 1 in which the said support member has a circular gear tooth portion thereon, and a movable slide having gear teeth in mesh with said circular gear teeth is slidably connected to the said outer member and is movable longitudinally thereon.

3. An outrigger as specified in claim 2 in which the said inner member carries a pin for engaging the said slide, the said outer member provided with a slot for such pin, and the pin is arranged to engage the said slide to pivot the said support member from near the frame to a position away from the frame during a predetermined portion of the outward extension of the outrigger.

4. An outrigger as specified in claim 1 in which the said different axis moves through a vertical plane which includes the first mentioned pivot axis of the said pivotal support member, during pivotal movement of the last named member between its extreme positions, whereby to provide a self-locking structure.

* * * * *